United States Patent
Okamoto et al.

(10) Patent No.: US 6,847,423 B2
(45) Date of Patent: Jan. 25, 2005

(54) LIQUID-CRYSTAL DISPLAY DEVICE

(75) Inventors: Mamoru Okamoto, Kanagawa (JP);
Tetuya Kimura, Kanagawa (JP);
Sounosuke Takahashi, Kanagawa (JP);
Nariyoshi Kotake, Kanagawa (JP);
Shinichi Nishida, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 53 days.

(21) Appl. No.: 10/454,494

(22) Filed: Jun. 5, 2003

(65) Prior Publication Data

US 2003/0227586 A1 Dec. 11, 2003

(30) Foreign Application Priority Data

Jun. 6, 2002 (JP) ......................................... 2002-166020

(51) Int. Cl.[7] ............................................. G02F 1/1335
(52) U.S. Cl. ....................... 349/106; 349/122; 349/138; 349/158
(58) Field of Search ................................. 349/106, 122, 349/138, 158

(56) References Cited

U.S. PATENT DOCUMENTS 6,413,693 B1 * 7/2002 Bekku et al. ............... 430/256

FOREIGN PATENT DOCUMENTS

JP 11-305216 11/1999

* cited by examiner

*Primary Examiner*—Robert H. Kim
*Assistant Examiner*—Michael H Caley
(74) *Attorney, Agent, or Firm*—Foley & Lardner LLP (57) ABSTRACT

A liquid-crystal display (LCD) device improves the performance of preventing the elution of impurity contained in the light-shielding layer (and the color layer) of the monochrome or color filter into the liquid crystal, thereby preventing defective operations of the LCD device (e.g., displaying defect) caused by impurity existing in the liquid crystal. The LCD device includes the protection layer made of a transparent organic resin, which satisfies at least one of a condition (a) that the transparent organic resin has a cross-link density of 70% or greater, and a condition (b) that the transparent organic resin has a Vickers hardness of 50 kgf/mm$^2$ or greater. Preferably, an amount of internal impurity of the filter is 3 ng/cm$^2$ or less. It is preferred that at least one selected from the group consisting of an acrylic resin, a styrene resin, and a polyimide resin is used as a base or matrix material of the transparent organic resin.

8 Claims, 9 Drawing Sheets

ITO LAYER FORMATION

FIG. 2B

BM FORMATION

FIG. 2C

COLOR LAYER FORMATION

FIG. 2D

OC LAYER FORMATION

LIQUID-CRYSTAL DISPLAY DEVICE

BACKGROUND OF THE INVENTION

1. Field of the Invention

The present invention relates to a Liquid-Crystal Display (LCD) device. More particularly, the invention relates to a LCD device having a color filter in which a color layer, a light-shielding layer, and a protection or overcoat layer are formed, or a LCD device having a monochrome filter in which a light-shielding layer and a protection (or overcoat) layer are formed.

2. Description of the Related Art

A prior-art color filter having a color layer, a light-shielding layer, and a protection layer for protecting the light-shielding layer is disclosed in the Japanese Non-Examined Patent Publication No. 11-305216 published in Nov. 5, 1999. This filter comprises a transparent plate, a patterned light-shielding layer, a patterned color filter layer (which may be termed a "color layer"), a protrusion layer, and an overcoat layer.

The light-shielding layer, which is matrix-shaped, is formed on a surface of the plate. The color filter layer (color layer), which is patterned to form pixels, is formed on the exposed areas of the surface of the plate from the light-shielding layer. The protrusion layer is formed by dot-shaped protrusions arranged on the matrix-shaped light-shielding layer. The protrusions serve as spacers arranged between the pair of transparent plates of the LCD device. The overcoat layer is formed over the whole surface of the plate to cover the light-shielding layer, the color filter layer, and the protrusion layer. The overcoat layer serves as a protection layer.

The above-described prior-art color filter is preferably used for IPS (In-Plane Switching) mode LCD devices. The overcoat layer in this color filter prevents some substances in the light-shielding layer, the color filter layer, and/or the protrusion layer from eluting. When this color filter is incorporated into an IPS-mode LCD device, the overcoat layer will prevents a trace of alkali metal ions and/or other unwanted substances from eluting into the liquid crystal. Thus, malfunction of the liquid crystal due to the alkali metal ions and/or other unwanted substances is avoided.

SUMMARY OF THE INVENTION

The present invention was created to accomplish a similar object to that of the above-described prior-art color filter disclosed in the Publication No. 11-305216.

Accordingly, an object of the present invention is to provide a LCD device that improves the performance of preventing the elution of impurity contained in a color layer and/or a light-shielding layer of a color filter into a liquid crystal.

Another object of the present invention is to provide a LCD device that improves the performance of preventing the elution of impurity contained in a light-shielding layer of a monochrome filter into a liquid crystal.

Still another object of the present invention is to provide a LCD device that prevents defective operations of a LCD device (e.g., displaying defect) caused by impurity existing in a liquid crystal more effectively.

The above objects together with others not specifically mentioned will become clear to these skilled in the art from the following description.

To accomplish these objects, the inventors made research vigorously and finally, they got the following knowledge.

(i) When a protection layer that covers a light-shielding layer (and a color layer) is made of a transparent organic resin having a cross-link density of 70% or greater, impurity contained in the light-shielding layer (and the color layer) is difficult or unable to penetrate the protection layer.

(ii) When a protection layer that covers a light-shielding layer (and a color layer) is made of a transparent organic resin having a Vickers hardness of 50 kgf/mm$^2$ or greater, impurity contained in the light-shielding layer (and the color layer) is difficult or unable to penetrate the protection layer.

Based on the above knowledge (i) and (ii), the inventors created the present invention as follows.

According to a first aspect of the present invention, a color LCD device is provided. This device comprises:

a substrate;

a color filter coupled with the substrate in such a way that a space is formed between the filter and the substrate;

a liquid crystal confined in the space;

the filter having a color layer, a light-shielding layer, and a protection layer;

the protection layer protecting the color layer and the light-shielding layer; and the protection layer being made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater.

With the device according to the first aspect of the invention, the protection layer of the color filter is made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater. Therefore, the protection layer exhibits a high blocking effect to the impurity existing in the color layer and the light-shielding layer. In other words, the impurity is difficult or unable to penetrate through the protection layer. This means that the performance of preventing the elution of the impurity is improved. Accordingly, defective operations of the color LCD device (e.g., displaying defect) caused by the impurity is prevented more effectively.

In a preferred embodiment of the device according to the first aspect of the invention, an amount of internal impurity of the filter is 3 ng/cm$^2$ or less. The method of measuring the internal impurity is explained later.

According to a second aspect of the present invention, a monochrome LCD device is provided. This device comprises.

a substrate;

a monochrome filter coupled with the substrate in such a way that a space is formed between the filter and the substrate;

a liquid crystal confined in the space;

the filter having a light-shielding layer and a protection layer for protecting the light-shielding layer; and the protection layer being made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater.

With the device according to the first aspect of the invention, the protection layer of the monochrome filter is made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater. Therefore, the protection layer exhibits a high blocking effect to the impurity existing in the light-shielding layer. In other words, the impurity is difficult or unable to penetrate through the protection layer. This means that the performance of preventing the elution of the impurity is improved. Accordingly, defective operations of the monochrome LCD device (e.g., displaying defect) caused by the impurity is prevented more effectively.

In a preferred embodiment of the device according to the second aspect of the invention, an amount of internal impurity of the filter is 3 ng/cm$^2$ or less. The method of measuring the internal impurity is the same as that of the device according to the first aspect.

In the devices according to the first and second aspects of the invention, the protection layer may be made of any transparent organic resin if it satisfies at least one of the conditions (a) and (b). However it is preferred that at least one selected from the group consisting of an acrylic resin, a styrene resin, and a polyimide resin is used as a base or matrix material of the transparent organic resin.

BRIEF DESCRIPTION OF THE DRAWINGS

In order that the present invention may be readily carried into effect, it will now be described with reference to the accompanying drawings.

DESCRIPTION OF THE PREFERRED EMBODIMENTS

Preferred embodiments of the present invention will be described in detail below while referring to the drawings attached.

Figure 1:
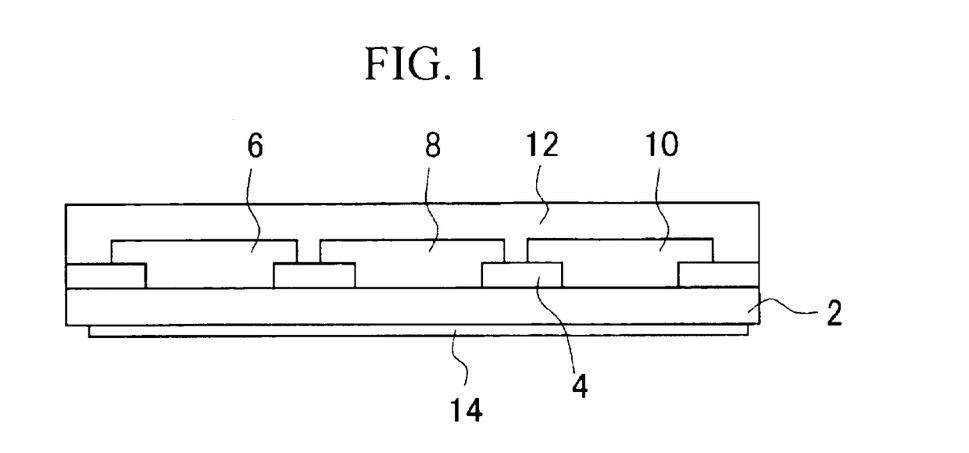
FIG. 1 is a schematic cross-sectional view of a color filter in which a color layer, a light-shielding layer, and a protection layer are formed, which is used for a color LCD device according to a first embodiment of the invention.

As shown in FIG. 1, a color filter used for a color LCD device according to a first embodiment of the invention comprises a transparent glass substrate 2; a patterned light-shielding layer 4 termed a black matrix (BM); a patterned color layer consisting of a patterned red (R) sublayer 6, a patterned green (G) sublayer 8, and a patterned blue (B) sublayer 10, a protection layer or overcoat (OC) layer 12; and a backside ITO (Indium Tin Oxide) layer 14.

The light-shielding layer 4 is formed on a surface of the glass plate 2. The layer 4 is matrix-shaped and made of black pigment and therefore, it is usually termed the black matrix (BM). The color layer, which is patterned to form pixels by the R, G, and B sublayers 6, 8, and 10 arranged regularly, is selectively formed on the exposed areas of the surface of the plate 2 from the light-shielding layer 4. The protection layer 12 is formed over the whole surface of the plate 2 to cover the light-shielding layer 4 and the color filter layer. The protection layer 12 protects the color layer and the light-shielding layer 4.

The protection layer 12 is made of a transparent organic resin satisfying at least one of the condition (a) that the transparent organic resin has a cross-link density of 70% or greater, and the condition (b) that the transparent organic resin has a Vickers hardness of 50 kgf/mm$^2$ or greater.

The backside ITO layer 14 is formed on the backside surface of the plate 2.

The light-shielding layer 4 may be made of a metal such as chromium (Cr) instead of black pigment, if it has a desired light-shielding property.

The above-described color filter according to the first embodiment can be fabricated in the process sequence shown in FIGS. 2A to 2D.

Figure 2A:
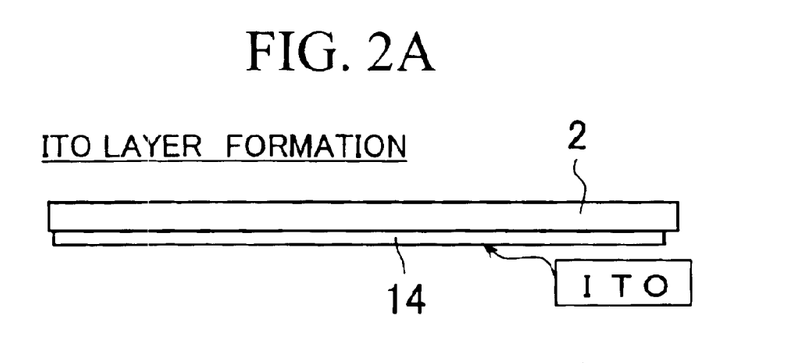
FIGS. 2A to 2D are schematic cross-sectional views of the color filter substrate used for the color LCD device according to the first embodiment of the invention, respectively.

First, the backside ITO layer 14 is formed on the backside surface of the glass plate 2 by sputtering, as shown in FIG. 2A.

Figure 2B:
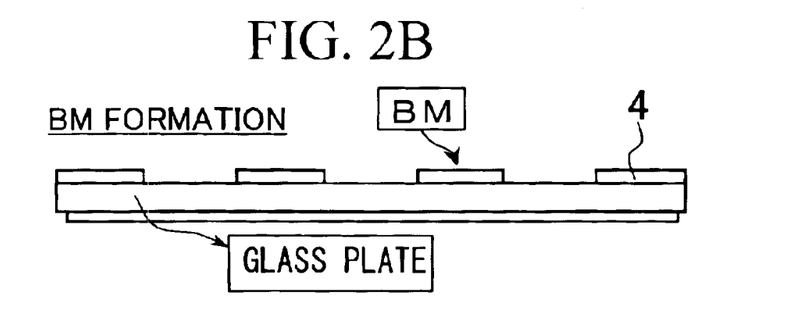

Next, the plate 2 with the ITO layer 14 is cleaned and then, a black pigment resist (not shown) is coated on the surface of the plate 2 by spin coating. By photolithography, the black pigment resist is patterned to form a matrix. Thus, the matrix-shaped light-shielding layer (i.e., the black matrix) 4 is formed on the surface of the plate 2, as shown in FIG. 2B.

Figure 2C:
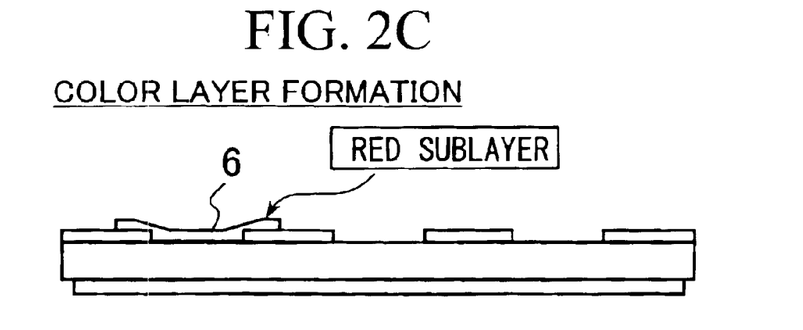

Subsequently, a red pigment resist (not shown) is coated on the surface of the plate 2 by spin coating. By photolithography, the red pigment resist is patterned to form a predetermined shape. Thus, the red sublayer 6 is selectively formed on the exposed areas of the surface of the plate 2 from the light-shielding layer 4, as shown in FIG. 2C. The sublayer 6 is partially located on the layer 4.

The same process as that for the red sublayer 6 is repeated twice, thereby forming the patterned green sublayer 8 and the patterned blue sublayer 10 on the exposed areas of the surface of the plate 2 from the light-shielding layer 4. Thus, the formation of the patterned color layer consisting of the sublayers 6, 8, and 10 is completed.

Figure 2D:
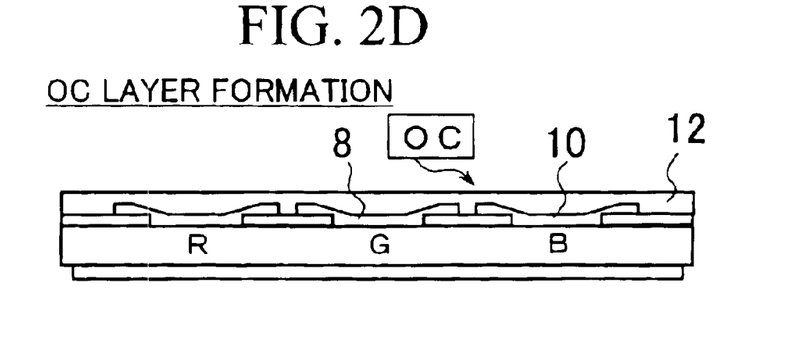

A material for the overcoat layer 12 is coated to cover the light-shielding layer 4 and the patterned color layer consisting of the sublayers 6, 8, and 10. Thereafter, the plate 2 with the layers 4 and the sublayers 6, 8, and 10 is subjected to a heat treatment. Thus, the material is sintered and as a result, the overcoat layer (i.e., the protection layer) 12 is formed, as shown in FIG. 2D.

Figure 3:
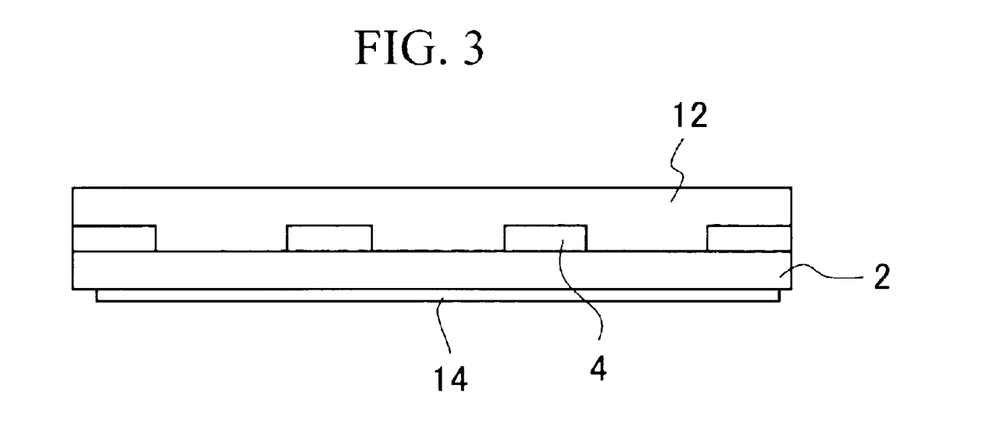
FIG. 3 is a schematic cross-sectional view of a monochrome filter substrate on which a monochrome filter in formed, which is used for a color LCD device according to a second embodiment of the invention.

FIG. 3 shows a monochrome filter used for a monochrome LCD device according to a second embodiment of the invention. This device has the same configuration as that of the device according to the first embodiment of FIG. 1 except that the color layer consisting of the red, green, and blue sublayers 6, 8, and 10 is eliminated. Specifically, this device comprises a transparent glass substrate 2, a patterned light-shielding layer 4 termed a black matrix (BM), a protection or overcoat layer 12, and a backside ITO layer 14.

The monochrome LCD device of the second embodiment can be fabricated through approximately the same process step sequence as the color LCD device of the first embodiment. Therefore, explanation about the fabrication method thereof is omitted here.

With the conventional color and monochrome filters to be used for the IPS-mode LCD device, the protection or overcoat layer 12 is made of a transparent organic resin having a cross-link density of approximately 50%. This resin has a Vickers hardness of approximately 48 kgf/mm$^2$. This resin has a problem that impurity (e.g., inorganic ions) contained in the color layer and/or light-shielding layer is likely to penetrate the protection layer, entering the liquid crystal. The impurity existing in the liquid crystal affects badly the operation of the LCD device and as a result, there is a possibility that displaying malfunction of the device (e.g., blot-shaped displaying defect) occurs. According to the result of the inventors' test, this malfunction is caused by the fact that the IPS-mode LCD device employs a liquid crystal having a lower resistivity than that of the Twisted Nematic (TN)-mode LCD device. For example, the resistivity of the liquid crystal for the TN-mode device is $1 \times 10^{13}$ Ω•cm while that for the IPS-mode device is $5 \times 10^{11}$ Ω•cm. Thus, it is considered that impurity existing in the liquid crystal of the IPS-mode device is likely to flow in the crystal and to gather in local regions. As a result, displaying malfunction of the device (e.g., blot-shaped displaying defect) is easily to occur in the IPS-mode device compared with the TN mode device. In other words, the effect by the impurity is more likely to be conspicuous in the IPS-mode device than the TN-mode device.

Conventionally, various measures have been taken against the problem. For example, the cleaning process for removing the pigments was conducted more strongly, and an improved liquid crystal or an improved material for the alignment layer (e.g., a material having an impurity-trapping property) was used. However, the obtainable effects by these conventional measures were not satisfactory.

Figure 4:
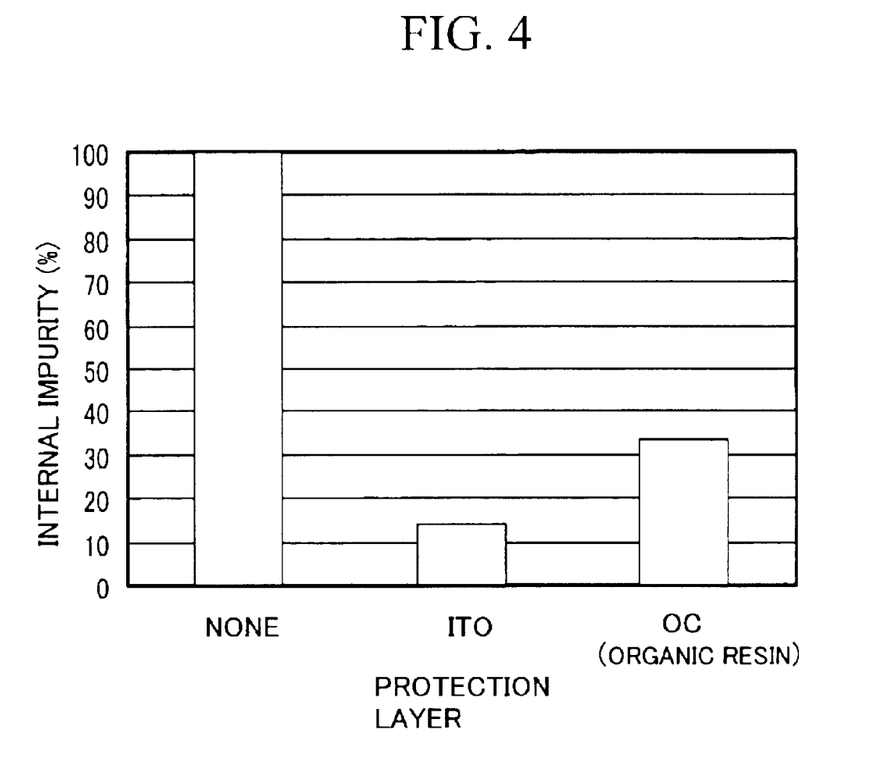
FIG. 4 is a graph showing the relationship between the internal impurity and the material of the protection layer (i.e., the overcoat layer), which shows the likelihood that impurity penetrates the protection layers made of different materials.

Moreover, the color filter for the TN-mode device includes an ITO layer serving as the pixel electrode layer that covers the color layer and the light-shielding layer. Unlike this, the color filter for the IPS-mode device does not include such the ITO layer, where the elution of impurity from the color layer and the light-shielding layer into the liquid crystal is prevented by the protection or overcoat layer 12 only. FIG. 4 shows the relationship between the internal impurity of the color filter and the material of the protection layer 12. As shown in FIG. 4, the impurity is more likely to penetrate through the protection or overcoat (OC) layer 12 made of an organic resin than to penetrate through the layer 12 made of ITO. As a result, the amount of impurity having penetrated through the protection layer 12 in the IPS-mode device is greater than that in the TN-mode device. This means that the displaying malfunction of the device (e.g., blot-shaped displaying defect) is induced in the IPS-mode device more easily than in the TN-mode device.

On the other hand, with the color filter according to the first embodiment of the invention (FIG. 1) and the monochrome filter according to the second embodiment of the invention (FIG. 3) to be used for the IPS-mode Device, as explained above, the overcoat or protection layer 12 is made of a transparent organic resin satisfying at least one of the condition (a) that the transparent organic resin has a cross-link density of 70% or greater, and the condition (b) that the transparent organic resin has a Vickers hardness of 50 kgf/mm$^2$ or greater. Therefore, the layer 12 exhibits a high blocking effect to the impurity existing in the color layer consisting of the R, C, and B sublayers 6, 8, 10, and the light-shielding layer 4. In other words, the said impurity is difficult or unable to penetrate through the protection layer 12. Accordingly, the displaying malfunction of the device (e.g., blot-shaped displaying defect) is effectively prevented even in the IPS-mode device.

In the specification, the wording "cross-link density" has the following meaning:

Specifically, if linear polymers are directly or indirectly coupled with each other by way of other polymers termed the cross-linking or curing agent, they have a "cross-linked structure", where the linear polymers are linked together at many "cross-linking points". The "cross-link density" denotes the ratio or percentage of the cross-linking points with respect to the whole structural units. As the "cross-link density" increases, the linking status of the linear polymers becomes more closely.

The "Vickers hardness" is a well-known way to express the hardness of a thing. The "Vickers hardness" is obtained by the known measuring method, where a diamond pyramid is pressed into a thing to be measured with a constant load of 5 to 50 kg to thereby form a dent on the surface of the thing, the length of the diagonal line of the dent is measured, and the applied load (kg) divided by the surface area (mm$^2$) of the dent. The surface area of the dent is measured by using the length of the diagonal line of the dent. Thus, the ratio or quotient of the applied load (kg) to the surface area (mm$^2$) of the dent gives the value of the Vickers hardness of the thing.

In the invention, the cross-link density of the overcoat or protection layer 12 has the lower limit of 70%. However, it is preferred that the lower limit of the density of the layer 12 is 75%. Although the density has no upper limit, it is preferred that the upper limit of the density of the layer 12 is 90%. Thus, preferably, the density of the layer 12 is in the range from 70% to 90%.

The Vickers hardness of the overcoat or protection layer 12 has the lower limit of 50 kgf/mm$^2$. However, it is preferred that the lower limit of the hardness of the layer 12 is 51.9 kgf/mm$^2$. Although the said hardness has no upper limit, it is preferred that the upper limit of the hardness of the layer 12 is 70 kgf/mm$^2$. Thus, preferably, the Vickers hardness of the layer 12 is in the range from 50 kgf/mm$^2$ to 70 kgf/mm$^2$.

Figure 5:
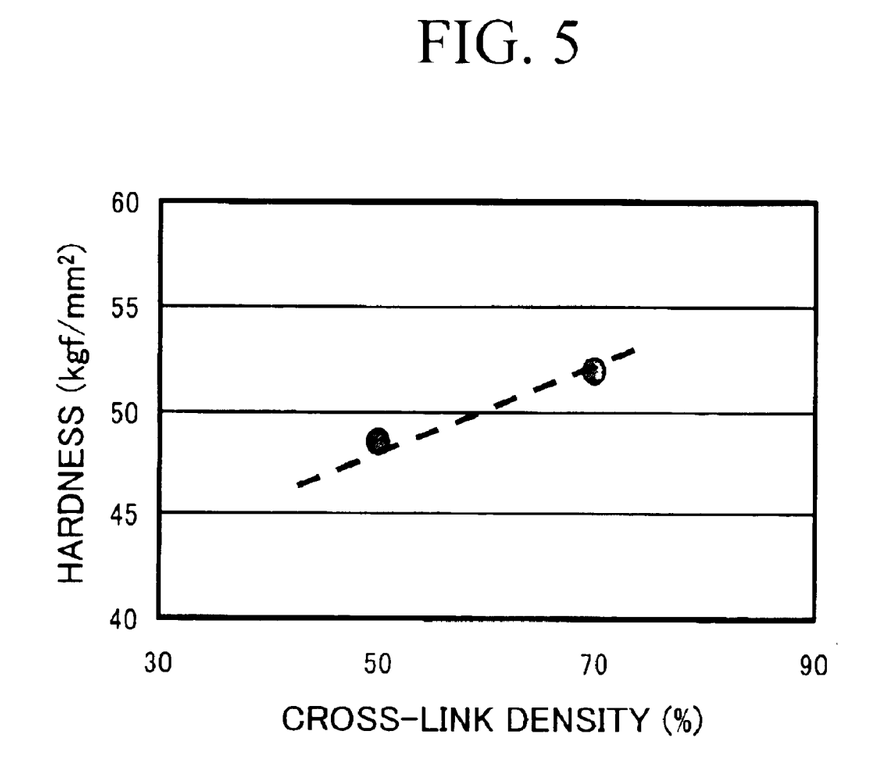
FIG. 5 is a graph showing the relationship between the cross-link density and the Vickers hardness of the protection layer (i.e., the overcoat layer).

The above-described cross-link density and the Vickers hardness have a correlation as shown in FIG. 5. As seen from FIG. 5, with the conventional overcoat or protection layer having a cross-link density of 50%, the Vickers hardness is 48.4 kgf/mm$^2$. With the overcoat or protection layer 12 having a cross-link density of 70% according to the invention, the Vickers hardness is 51.9 kgf/mm$^2$. The present invention was created by the inventors based on their knowledge that if the overcoat layer has a higher cross-link density, it has a higher blocking effect against the penetration of the impurity existing in the color layer and the light-shielding layer 4, and that a positive correlation is present between the cross-link density and the Vickers hardness.

To raise the cross-link density of the overcoat or protection layer 12, for example, it is preferred that (i) the amount or density of curing agent to be added to a transparent organic resin for the layer 12 is increased, or (ii) the reaction (i.e., polymerization) rate of a transparent organic resin for the layer 12 is decreased to raise the degree of polymerization thereof. It is considered that the other properties of the layer 12, such as the sealing strength, relative dielectric constant, resistivity, have no relationship with the blocking effect to the penetration of the impurity existing in the color layer and the light-shielding layer 4.

A concrete example of materials to be used as the transparent organic resin for the overcoat layer 12 is as follows,
Name: JSS-319 produced by JSR (Japanese Company)
Type: thermosetting transparent acrylic resin
Ingredients:
(1) an acrylic resin (matrix polymer): 15–25%.
(2) an epoxy resin (cross-linking agent): 1–4%
(3) diethylene glycol methyl ether (solvent): 50–70%
(4) methoxy propyl acetate (solvent): 10–25%
(5) coupling agent (for raising adhesion property to the glass plate): 1–5%

A concrete example of the process for forming the protection layer 12 is as follows.

First, the color layer and the light-shielding layer 4 are formed on the surface of the glass plate 2 and then, the plate 2 having the color layer and the light-shielding layer 4 is cleaned. Thereafter, a material for the overcoat layer 12 is coated on the whole plate 2 by spin coating. The solvent in the material thus coated is removed by a pre-bake process (for example, the plate 2 is heated with a hot plate at 100° C. for two minutes) and then, the material is sintered (for example, the plate 2 is heated with a clean oven at 230° C. for one hour), thereby curing the material for the layer 12 by heat.

Figure 9:
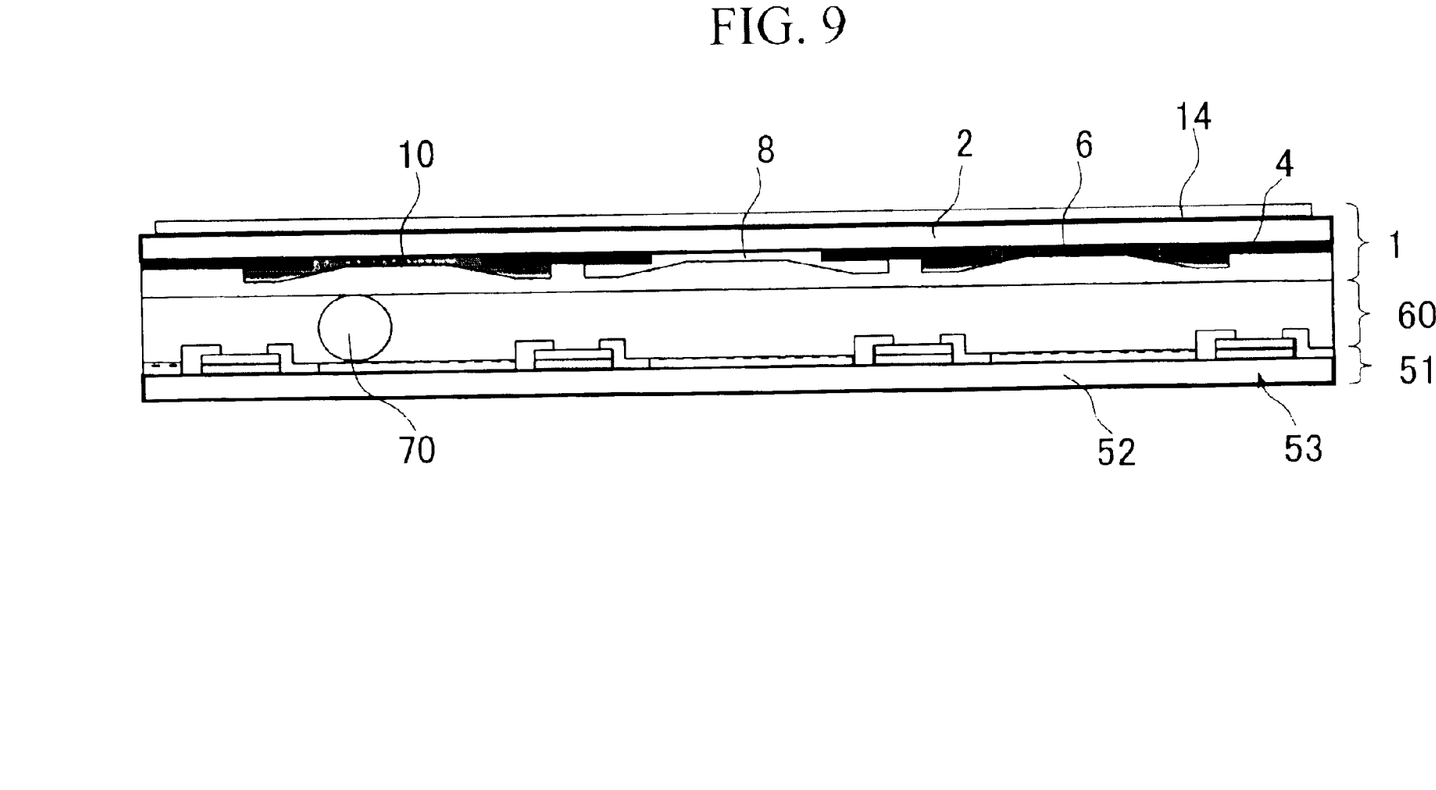
FIG. 9 is a schematic cross-sectional view of an IPS-mode color LCD device using the color filter according to the first embodiment of FIG. 1.

FIG. 9 schematically shows the structure of the IPS-mode color LCD device, in which the above-described color filter 1 according to the first embodiment of FIG. 1 is used. The filter 1 is coupled with a substrate 51 comprising a transparent glass plate 52 and Thin-Film Transistors (TFTs) 53 as switching elements. The TFTs 53 are regularly arranged on the inner surface of the plate 52. A liquid crystal 60 is confined in the space between the filter 1 and the substrate 51. Ball-shaped spacers 70 are dispersed in the liquid crystal 60.

If the monochrome filter according to the second embodiment of FIG. 3 is coupled with the substrate 51, an IPS-mode monochrome LCD device is configured.

For the sake of simplification, the other structural parts, such as the peripheral spacer, the sealing material for sealing the periphery of the filter 1, the sealing material for the bore for introducing the liquid crystal 60, and the polarizer plate, are omitted in FIG. 9. This is because these parts and their fabrication processes are well known.

(Experiment)

To confirm the advantages of the invention, the inventors conducted the following experiment by measuring the internal impurity contained in the color filter of the LCD device.

(Measuring Method)

First, color filters 30 having the same structure as shown in FIG. 1 were fabricated. Then, impurity existing on one of the filters 30 was measured in the following way.

Figure 6:
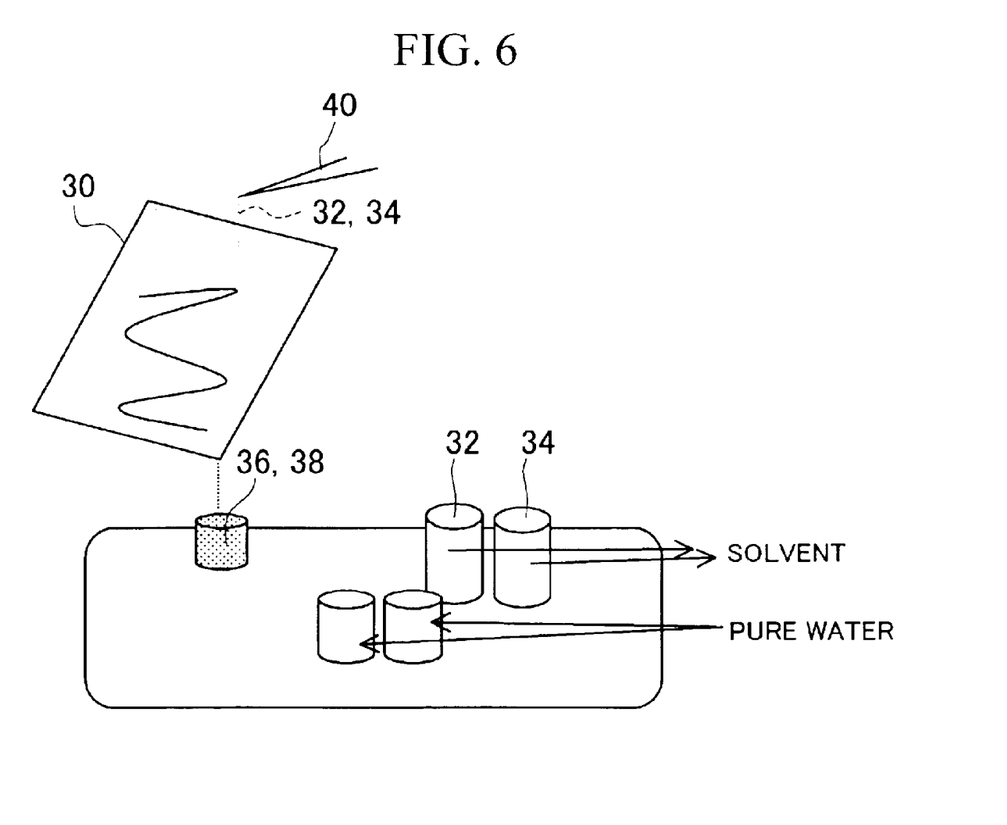
FIG. 6 is a schematic perspective view showing the sampling method used in the inventors' test.

A predetermined area of the surface of the overcoat layer (i.e., the protection layer) 12 of the filter 30 was cleaned by the first solvent (i.e., ethanol) 32 with a pipette 40, as shown in FIG. 6. The first solvent 32 used for cleaning the said area was collected in a container as the first sample 36. This is the first sampling process.

Next, the same area of the surface of the layer 12 was cleaned by the second solvent (i.e., acetone) 34 with the pipette 40, as shown in FIG. 6. The second solvent 34 is opposite in polarity to the first solvent 32. The second solvent 34 used for cleaning the area was collected in another container as the second sample 38. This is the second sampling process.

Needless to say, the experimental instruments such as the pipette 40 and the filters 30 used in the first and second sampling processes were cleaned with pure water before they were used.

Since ethanol was used in the first sampling process, only the impurity existing on the surface of the overcoat layer 12 was collected or gathered in the first sample 36. On the other hand, since acetone was used in the second sampling process, only the impurity existing in the overcoat layer 12 due to permeation was collected or gathered.

Thereafter, the first and second samples 36 and 38 were mixed to each other and the amount of the impurity contained in the mixture of the samples 36 and 38 (which is termed the "internal impurity") was measured. At this time, the amount of the metal impurities, such as the sodium (Na) ion, potassium (Ka) ion, and copper (Cu) ion, was measured with a frameless atomic absorption measuring apparatus (Name: Spectro AA-400Z, Manufacturer: Varian). The amount of the nonmetal impurities, such as the chloride (Cl) ion, bromide (Br) ion, nitrate ($NO_3$) ion, and sulfate ($SO_4$) ion, was measured with an ion chromatograph (Name: DX-300, Manufacturer: DIONEX).

The first and second sampling processes were repeatedly carried out for each of the remaining color filters 30 fabricated.

(Object to be Measured)

The structure of the color filters 30 used in the experiment was the same as that of FIG. 1. The count of the filters 30 was 10. The five filters 30 included the protection or overcoat layer with a cross-link density of 70%. The five other filters 30 included the protection or overcoat layer with a cross-link density of 50%.

(Result)

Figure 7:
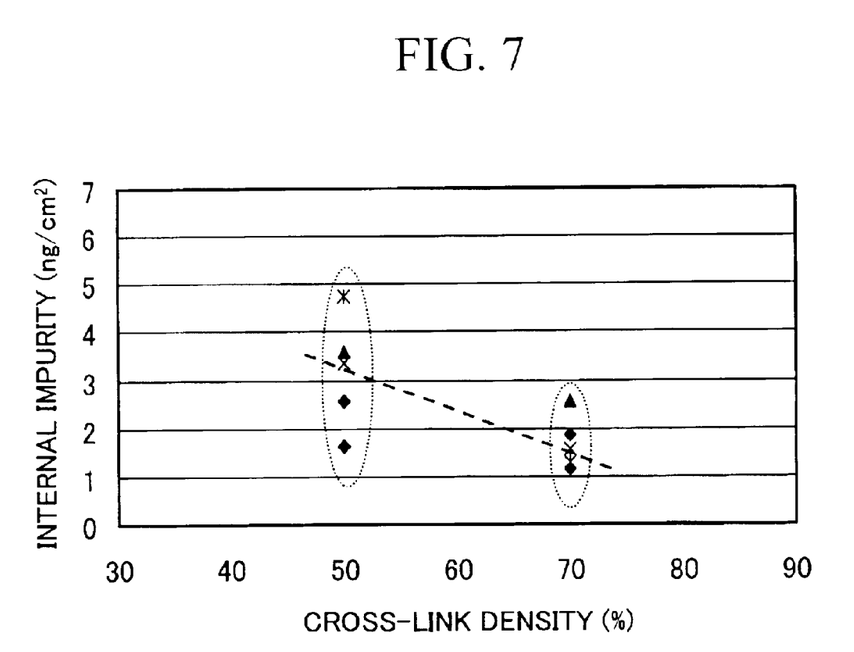
FIG. 7 is a graph showing the relationship between the cross-link density of the protection layer (i.e., the overcoat layer) and the internal impurity.
Figure 8:
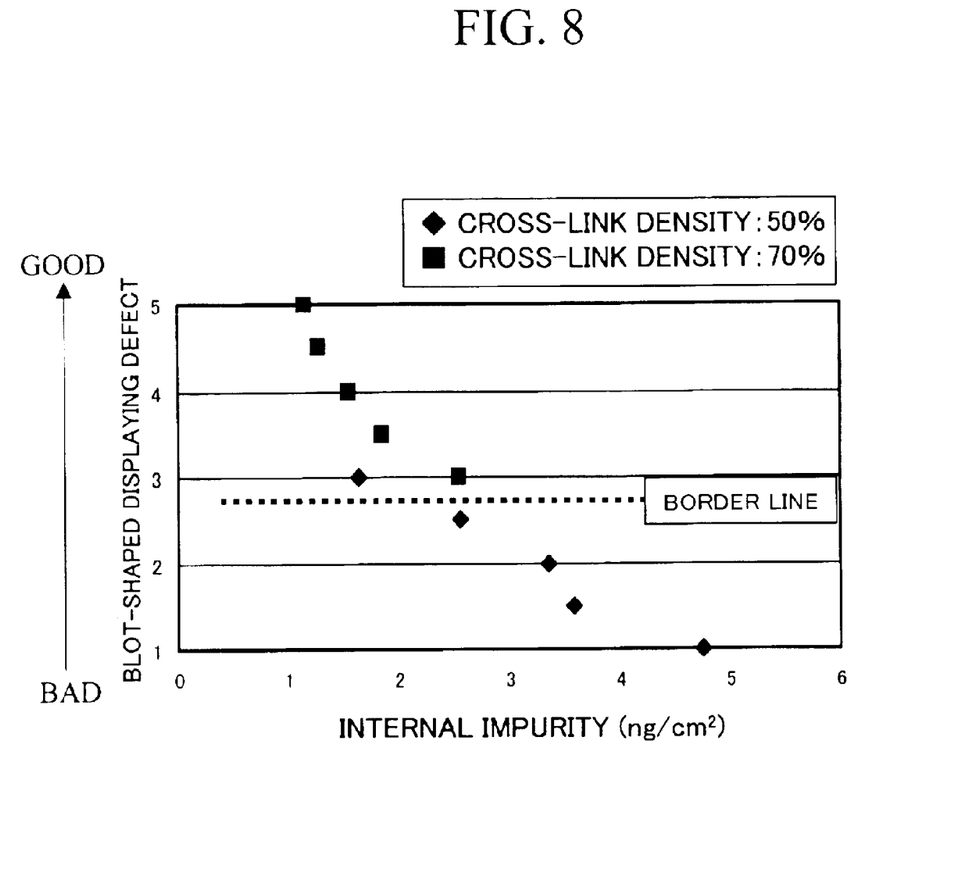
FIG. 8 is a graph showing the relationship between the level of the blot-shaped displaying defect and the internal impurity.

FIG. 7 shows the relationship between the cross-link density of the protection or overcoat layer and the internal impurity, where the "internal impurity" is the sum of the impurities contained in the first and second samples 36 and 38. FIG. 8 shows the relationship between the level (i.e., good or bad) of the blot-shaped displaying defect and the internal impurity.

The level of the blot-shaped displaying defect in FIG. 8 was determined in the following way.

Level 5: ⊚ (no blot was observed; good)
Level 4: ○ (blot was scarcely observed; good)
Level 3: △ (blot was observed; acceptable)
Level 2: X (blot was observed; lightly bad)
Level 1: XX (blot was observed; bad)

As seen from FIGS. 7 and 8, regarding the color filters 30 with the cross-link density of 70%, it is seen that the amount of the internal impurity is relatively smaller, and that the level of the blot-shaped displaying detect is in the acceptable level or higher levels. It is also seen that the acceptable level of the internal impurity is approximately 3 ng/$cm^2$ or less. On the other hand, regarding the color filters 30 with the cross-link density of 50%, it is seen that the amount of the internal impurity is relatively larger, and that the level of the blot-shaped displaying defect is below the acceptable level.

It is needless to say that the invention is not limited to the above-described first and second embodiments. Any modification is applicable to these embodiments. For example, although the invention is applied to the IPS-mode color or monochrome LCD device, the invention may be applied to any other mode (e.g., the TN-mode) of the LCD device. Moreover, the structure and material used for the color or monochrome filter and the LCD device are changeable according to the necessity.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A color liquid-crystal display (LCD) device comprising:
   a substrate;
   a color filter coupled with the substrate in such a way that a space is formed between the filter and the substrate;
   a liquid crystal confined in the space;
   the filter having a color layer, a light-shielding layer, and a protection layer;
   the protection layer protecting the color layer and the light-shielding layer; and
   the protection layer being made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater.

2. The device according to claim 1, wherein an amount of internal impurity of the filter is 3 ng/cm$^2$ or less.

3. The devise according to claim 1, wherein at least one selected from the group consisting of an acrylic resin, a styrene resin, and a polyimide resin is used as a base or matrix material of the transparent organic resin.

4. The device according to claim 1, wherein the device is operated in an (In-Plane Switching) IPS mode.

5. A monochrome liquid-crystal display (LCD) comprising:
   a substrate;
   a monochrome filter coupled with the substrate in such a way that a space is formed between the filter and the substrate;
   a liquid crystal confined in the space;
   the filter having a light-shielding layer and a protection layer for protecting the light-shielding layer; and
   the protection layer being made of a transparent organic resin satisfying at least one of a condition (a) that the transparent organic resin has a cross-link density of 70% or greater, and a condition (b) that the transparent organic resin has a Vickers hardness of 50 kgf/mm$^2$ or greater.

6. The device according to claim 5, wherein an amount of internal impurity of the filter is 3 ng/cm$^2$ or less.

7. The device according to claim 5, wherein at least one selected from the group consisting of an acrylic resin, a styrene resin, and a polyimide resin is used as a base or matrix material of the transparent organic resin.

8. The device according to claim 5, wherein the device is operated in an (In-Plane Switching) IPS mode.

* * * * *